US011669954B2

(12) United States Patent
Ito

(10) Patent No.: US 11,669,954 B2
(45) Date of Patent: Jun. 6, 2023

(54) INFORMATION PROCESSING APPARATUS AND METHOD FOR CONTROLLING SAME

(71) Applicant: CANON KABUSHIKI KAISHA, Tokyo (JP)

(72) Inventor: Aya Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 17/088,473

(22) Filed: Nov. 3, 2020

(65) Prior Publication Data
US 2021/0142459 A1 May 13, 2021

(30) Foreign Application Priority Data

Nov. 13, 2019 (JP) .............................. JP2019-205588

(51) Int. Cl.
G06K 9/00 (2022.01)
G06T 7/00 (2017.01)
H04N 1/00 (2006.01)
(52) U.S. Cl.
CPC ......... G06T 7/001 (2013.01); H04N 1/00018 (2013.01); H04N 1/00034 (2013.01); G06T 2207/30168 (2013.01); G06T 2207/30176 (2013.01)

(58) Field of Classification Search
CPC ........... G06T 7/001; G06T 2207/30168; G06T 2207/30176; G06T 2207/10008; G06T 2207/30144; H04N 1/00018; H04N 1/00034
See application file for complete search history.

(56) References Cited

U.S. PATENT DOCUMENTS

2014/0079293 A1* 3/2014 Kitai ..................... G06T 7/0008
382/112
2014/0341437 A1* 11/2014 Araki .................... G06T 7/0008
382/112
2020/0058115 A1* 2/2020 Mimura .................. G06T 7/001

FOREIGN PATENT DOCUMENTS

JP H09109371 A * 4/1997
JP 3863931 B2 12/2006
JP 2010019646 * 1/2010

* cited by examiner

Primary Examiner — Samir A Ahmed
(74) Attorney, Agent, or Firm — Canon U.S.A., Inc. IP Division

(57) ABSTRACT

An information processing apparatus obtains a plurality of scanned images, determines whether each of the plurality of scanned images is suitable for use in generating a reference image, by using a master image for generating the reference image, and generates the reference image by combining a plurality of scanned images determined to be suitable for use in generating the reference image.

10 Claims, 8 Drawing Sheets

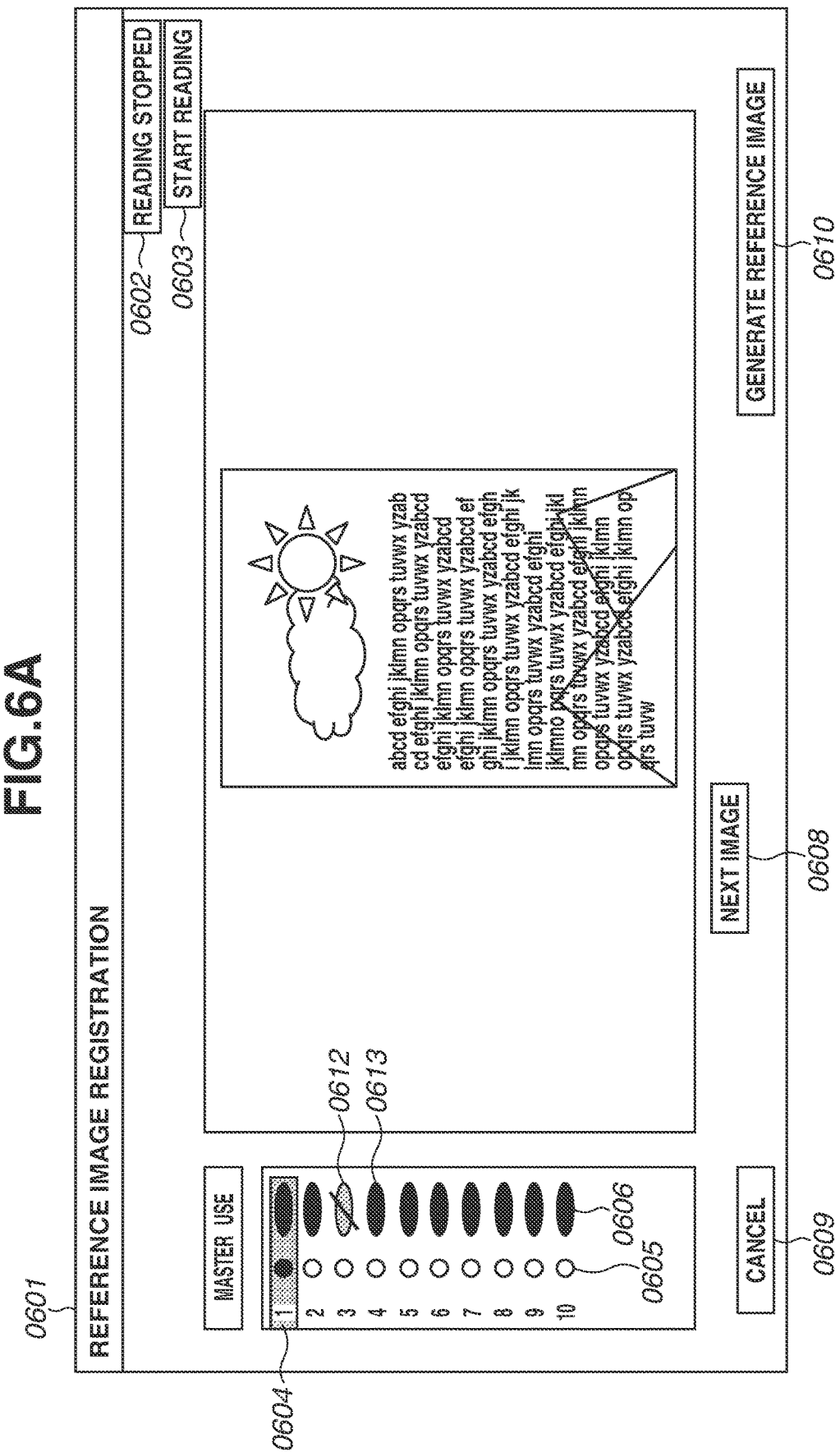

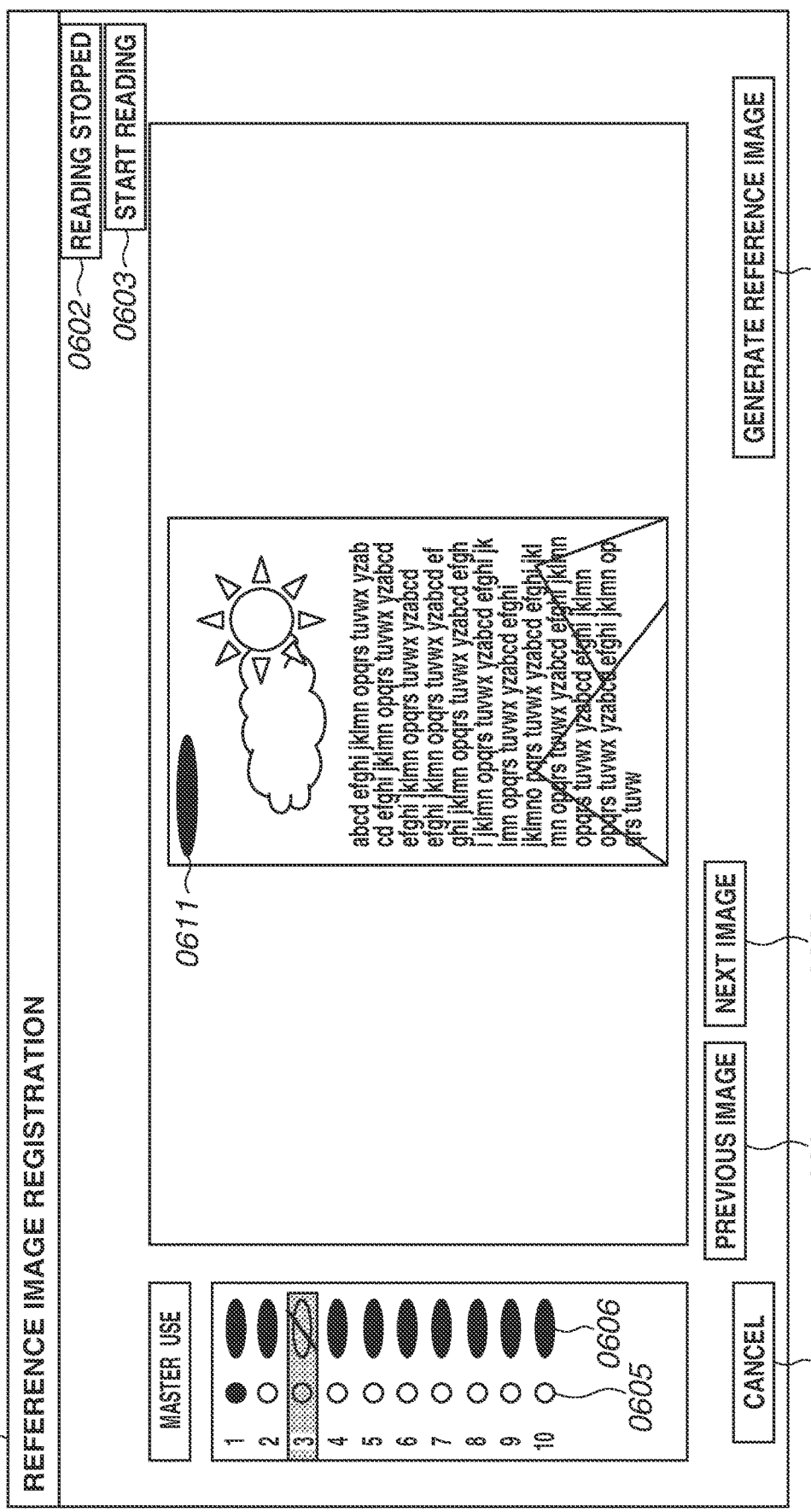

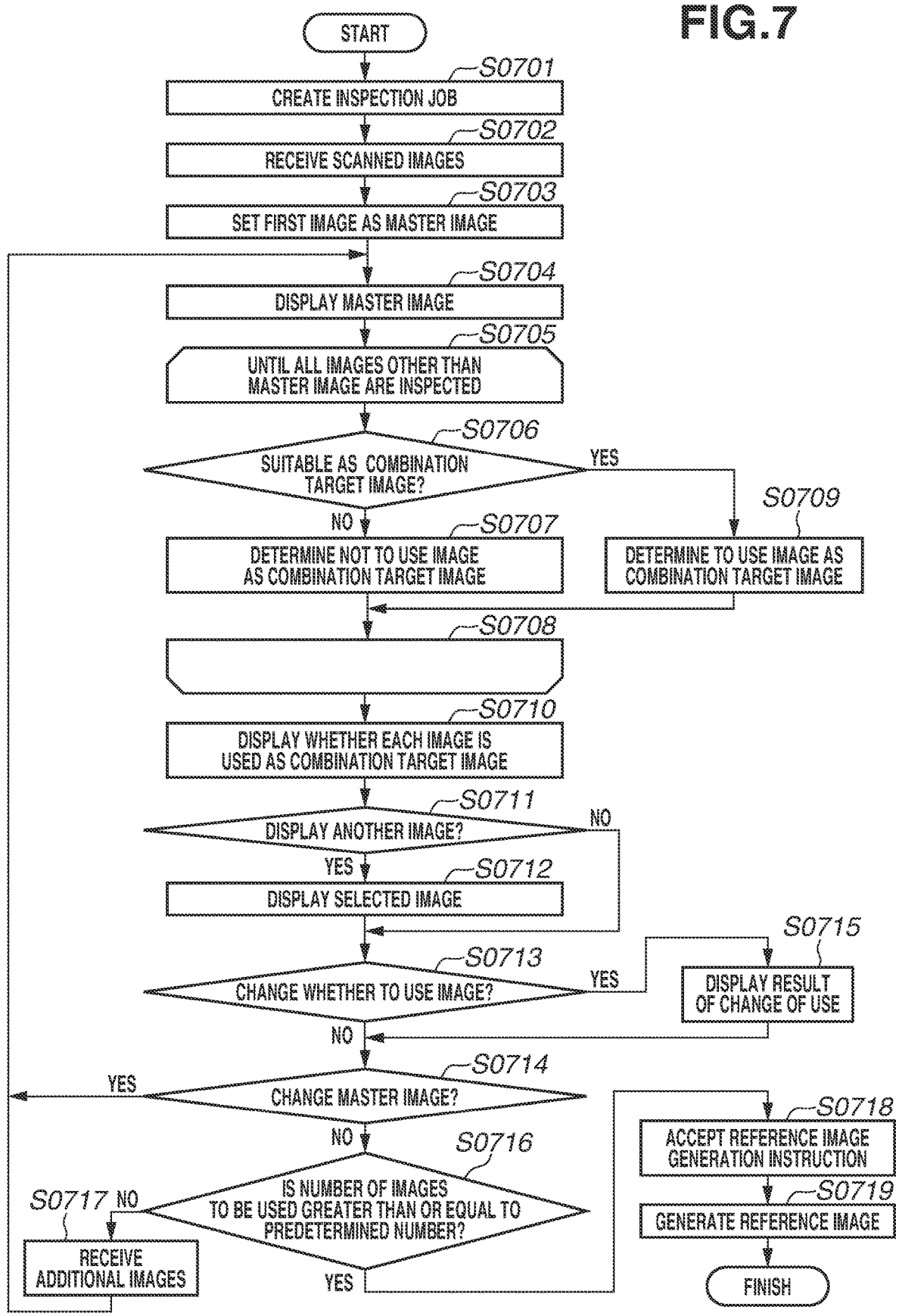

INFORMATION PROCESSING APPARATUS AND METHOD FOR CONTROLLING SAME

BACKGROUND

Field of the Disclosure

The present disclosure relates to a technique for inspecting quality of a print product printed by a printing apparatus.

Description of the Related Art

An inspection apparatus that reads a print product printed by a printing apparatus and inspects the quality of the print product has been known. The inspection apparatus can detect image defects such as stains and omissions, typographical errors, barcode quality, and the like.

The inspection apparatus inspects an image to be inspected by comparing the image with a reference image registered in advance. While digital data such as Portable Document Format (PDF) data can be used as the reference image, an image generated by scanning a conforming image printed once is sometimes used. The reasons are that the image to be inspected is an image on a print product and thus high inspection accuracy can be expected when the reference image has the same data format as that of the image to be inspected, and also data conversion is not required.

If the reference image is generated by scanning a single print product, there is an issue that the generated reference image may fail to satisfy the required quality of the reference image. Examples of the reasons include the occurrence of a stain due to anomaly in the printing apparatus during printing, the occurrence of displacement of the reading position during scanning, and the occurrence of a sheet distortion due to a high-temperature high-humidity environment. To solve such an issue, Japanese Patent No. 3863931 discusses a technique for calculating the median value of densities of a plurality of images on a pixel-by-pixel basis and using the median value as the pixel value of a reference image.

However, in Japanese Patent No. 3863931, there is an issue that even if a plurality of images for generating a reference image includes a scanned image of a badly stained print product, the plurality of images is simply combined to generate the reference image. Suppose that a print product significantly different in density from the others is included. In such a case, using the median value of densities of the plurality of images reduces the effect of the print product, compared to when only a scanned image of the print product is used as the reference image. However, the quality of the reference image as a desired conforming image reduces. In addition, a reduction in the quality of the reference image can hinder the execution of inspection with accuracy originally intended by the user.

SUMMARY

Embodiments of the present disclosure are directed to providing a technique that generates a high-quality reference image when a reference image for evaluating the quality of a print product is generated by combining a plurality of images, and thereby maintains high inspection accuracy.

According to embodiments of the present disclosure, an information processing apparatus includes a first obtaining unit configured to obtain a plurality of scanned images, a determination unit configured to determine whether each of the plurality of scanned images is suitable for use in generating a reference image, by using a master image for generating the reference image, and a generation unit configured to generate the reference image by combining a plurality of scanned images determined to be suitable for use in generating the reference image among the plurality of scanned images.

Further features of the present disclosure will become apparent from the following description of exemplary embodiments with reference to the attached drawings.

BRIEF DESCRIPTION OF THE DRAWINGS

FIGS. 6A and 6B are diagrams each illustrating a reference image registration screen.

FIG. 7 is a flowchart illustrating an operation performed by the inspection apparatus during reference image registration.

DESCRIPTION OF THE EMBODIMENTS

Exemplary embodiments of the present disclosure will be described below with reference to the drawings. It will be understood that the exemplary embodiments of the present disclosure are applicable to both an inspection apparatus configured as a single device and an inspection apparatus including a plurality of devices as long as the functions according to the exemplary embodiments of the present disclosure are implemented, unless otherwise specified. The exemplary embodiments of the present disclosure are also applicable to an inspection apparatus that is connected and performs processing via a network, such as a local area network (LAN) or a wide area network (WAN) as long as the functions according to the exemplary embodiments of the present disclosure are implemented, unless otherwise specified. It will be understood that a system configuration described in the following exemplary embodiments where various terminals are connected to each other is just an example, and there are various configuration examples depending on application and intended use.

Figure 1:
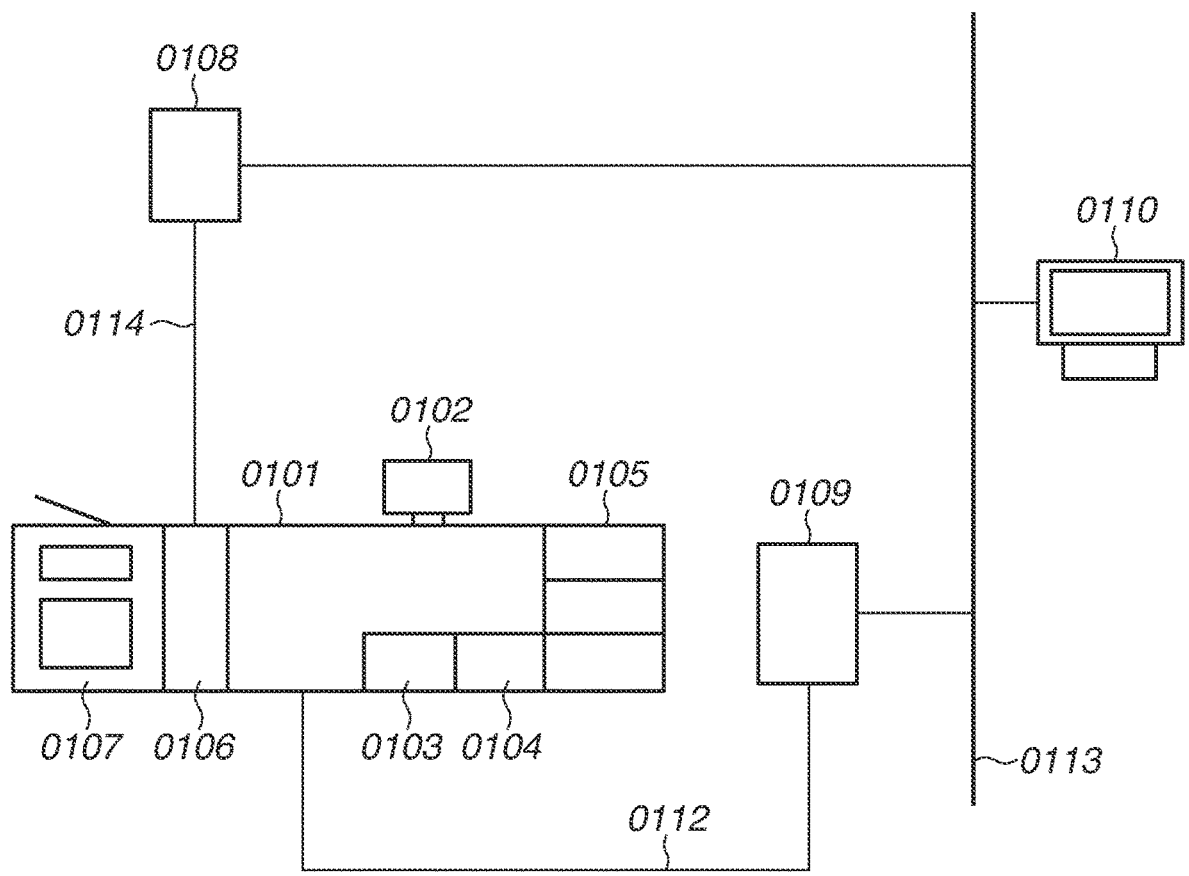
FIG. 1 is a schematic diagram illustrating a configuration of an information processing apparatus, an inspection apparatus, and a printing apparatus.

FIG. 1 is a schematic diagram illustrating a configuration of an information processing apparatus, an inspection apparatus, and a printing apparatus that constitute an inspection system according to the present exemplary embodiment. An electrophotographic printing apparatus will be described as the printing apparatus according to the present exemplary embodiment. Alternatively, the printing apparatus according to the present exemplary embodiment may be a printing apparatus using any other image forming method, such as an inkjet printing apparatus or an offset printing apparatus.

A printing apparatus 0101 is connected to an information processing apparatus 0109 via a cable 0112. The information processing apparatus 0109 is connected to a client computer 0110 and an inspection apparatus 0108 via a network 0113.

The printing apparatus 0101 includes a user interface (UI) panel 0102, a sheet feed deck 0103, and a sheet feed deck 0104. In addition, an optional deck 0105 including three stages of sheet feed decks is connected to the printing apparatus 0101. The printing apparatus 0101 is an electrophotographic printing apparatus, for example. The UI panel 0102 includes a capacitive touch panel, for example.

The printing apparatus 0101 further includes an inspection unit 0106 and a large capacity stacker 0107. The inspection unit 0106 is connected to the inspection apparatus 0108 via a cable 0114. The large capacity stacker 0107 includes a main tray and a top tray. Several thousands of sheets can be stacked on the main tray at a time.

A print job is generated by the client computer 0110, transmitted to the information processing apparatus 0109 via the network 0113, and managed by the information processing apparatus 0109. The print job is then transmitted from the information processing apparatus 0109 to the printing apparatus 0101 via the cable 0112, and the printing apparatus 0101 performs processing for printing on sheets. Alternatively, a print job may be generated and managed by the information processing apparatus 0109, transmitted to the printing apparatus 0101 via the cable 0112, and managed by the printing apparatus 0101.

As another configuration, the client computer 0110, the information processing apparatus 0109, and the inspection apparatus 0108 may be connected and communicate with the printing apparatus 0101 via the cable 0112. In other words, the connection configuration of the printing apparatus 0101, the inspection apparatus 0108, the information processing apparatus 0109, and the client computer 0110 described in the present exemplary embodiment is just an example. It will be understood that there are various connection configurations other than that described in the present exemplary embodiment.

Figure 2:
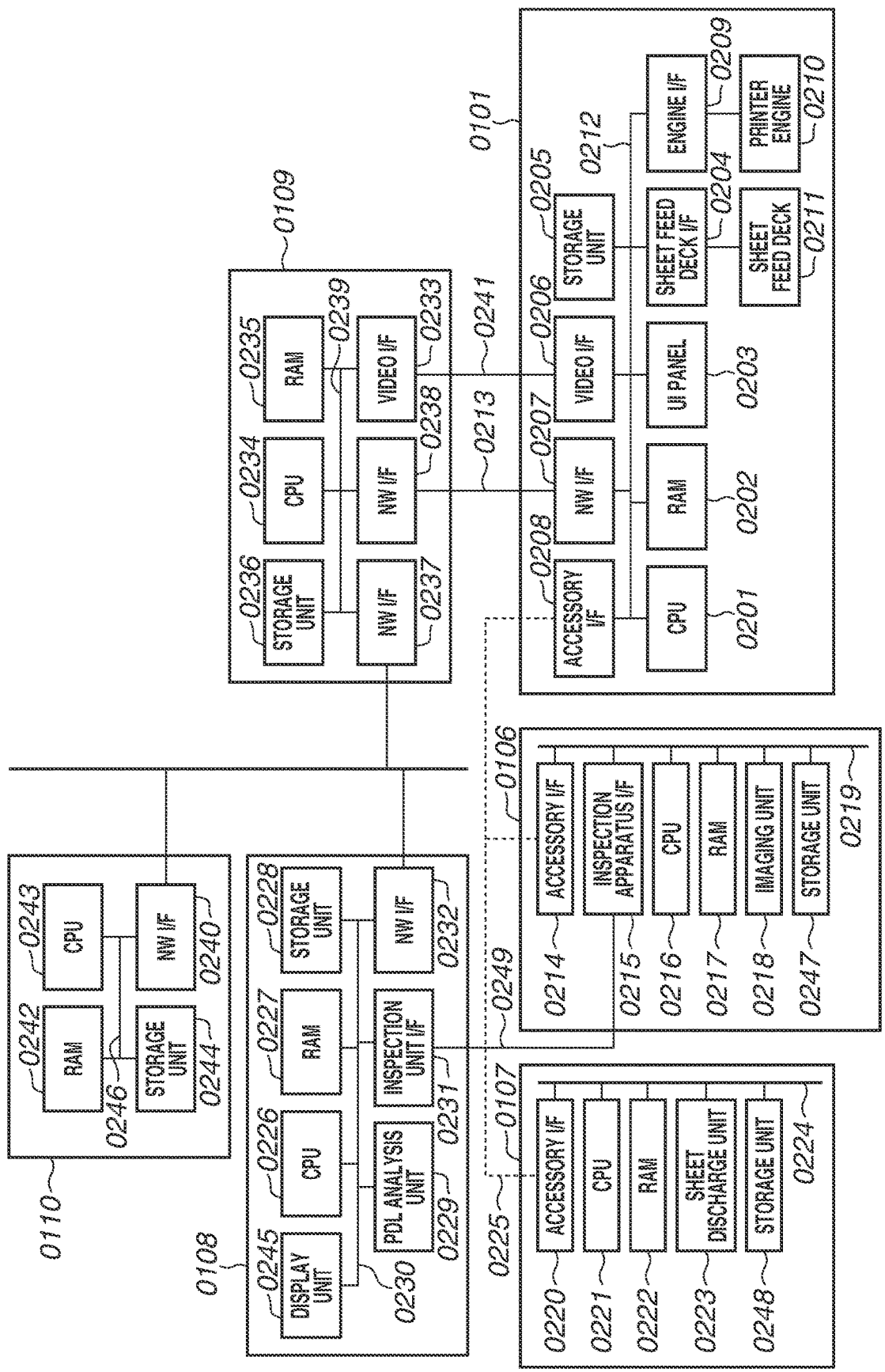
FIG. 2 is a block diagram illustrating a control configuration of the information processing apparatus, the inspection apparatus, and the printing apparatus.

FIG. 2 is a block diagram illustrating a control configuration of the printing apparatus 0101, the inspection unit 0106, the inspection apparatus 0108, the large capacity stacker 0107, the information processing apparatus 0109, and the client computer 0110 according to the present exemplary embodiment.

A central processing unit (CPU) 0201 performs control and calculation in each unit of the printing apparatus 0101 via a system bus 0212. The CPU 0201 executes programs that are stored in a storage unit 0205 and loaded into a random access memory (RAM) 0202. The RAM 0202 is a kind of typical volatile storage device directly accessible from the CPU 0201, and is used as a work area of the CPU 0201 or other temporary data storage areas. The storage unit 0205 functions as a temporary storage area and a work memory when the printing apparatus 0101 is in operation.

An engine interface (I/F) 0209 communicates with and controls a printer engine 0210. A sheet feed deck I/F 0204 communicates with and controls a sheet feed deck 0211. The sheet feed deck 0211 is a general term referring to the sheet feed decks 0103 and 0104 and the optional deck 0105 as a hardware configuration. A UI panel 0203 is a hardware configuration of the UI panel 0102, and is used to perform the entire operation of the printing apparatus 0101. In the present exemplary embodiment, the UI panel 0203 includes a capacitive touch panel.

A network I/F (NW I/F) 0207 is connected to an NW I/F 0238 of the information processing apparatus 0109 via a cable 0213, and controls communication between the information processing apparatus 0109 and the printing apparatus 0101. In the example illustrated in FIG. 2, the NW I/Fs 0207 and 0238 respectively connected with the system bus 0212 and a system bus 0239 are directly connected to each other. However, the connection configuration of the information processing apparatus 0109 and the printing apparatus 0101 is not limited thereto. For example, the information processing apparatus 0109 and the printing apparatus 0101 may be connected to each other via a network. A video I/F 0206 is connected to a video I/F 0233 via a video cable 0241, and controls communication of image data between the information processing apparatus 0109 and the printing apparatus 0101.

The connection interface of the information processing apparatus 0109 with the printing apparatus 0101 may be configured to integrate the functions of the NW I/F 0238 and the video I/F 0233. The connection interface of the printing apparatus 0101 with the information processing apparatus 0109 may be configured to integrate the functions of the NW I/F 0207 and the video I/F 0206.

An accessory I/F 0208 is connected to an accessory I/F 0214 and an accessory I/F 0220 via a cable 0225. More specifically, the printing apparatus 0101 communicates with the inspection unit 0106 and the large capacity stacker 0107 via the accessory I/Fs 0208, 0214, and 0220.

A CPU 0216 performs control and calculation in each unit of the inspection unit 0106 via a system bus 0219, and executes programs that are stored in a storage unit 0247 and loaded into a RAM 0217. The RAM 0217 is a kind of typical volatile storage device directly accessible from the CPU 0216, and is used as a work area of the CPU 0216 or other temporary data storage areas. The storage unit 0247 functions as a temporary storage area and a work memory when the inspection unit 0106 is in operation. An inspection apparatus I/F 0215 is connected to an inspection unit I/F 0231 via a cable 0249. More specifically, the inspection unit 0106 communicates with the inspection apparatus 0108 via the inspection apparatus I/F 0215 and the inspection unit I/F 0231.

An imaging unit 0218 has an imaging function incorporating a contact image sensor (CIS), for example. The imaging unit 0218 captures an image of a sheet passing through the inspection unit 0106, and transmits the captured image to the inspection apparatus 0108 via the inspection apparatus I/F 0215. The CIS is just an example of a sensor of the imaging unit 0218, and the imaging method is not limited thereto. Other types of sensors, such as a charge-coupled device (CCD) image sensor, may be used.

A CPU 0221 performs control and calculation in each unit of the large capacity stacker 0107 via a system bus 0224, and executes programs that are stored in a storage unit 0248 and loaded into a RAM 0222. The RAM 0222 is a kind of typical volatile storage device directly accessible from the CPU 0221, and is used as a work area of the CPU 0221 or other temporary data storage areas. The storage unit 0248 functions as a temporary storage area and a work memory when the large capacity stacker 0107 is in operation. A sheet discharge unit 0223 monitors and controls sheet discharge operations on the main and top trays, and stacking conditions of the main and top trays.

A CPU 0226 performs control and calculation in each unit of the inspection apparatus 0108 via a system bus 0230, and executes programs that are stored in a storage unit 0228 and loaded into a RAM 0227. The RAM 0227 is a kind of typical volatile storage device directly accessible from the CPU 0226, and is used as a work area of the CPU 0226 or other temporary data storage areas. The storage unit 0228 functions as a temporary storage area and a work memory when the inspection apparatus 0108 is in operation. A page description language (PDL) analysis unit 0229 reads PDL data, such as Portable Document Format (PDF) data, PostScript data, and Printer Command Language (PCL) data, received from the client computer 0110 or the information processing apparatus 0109, and performs interpretation processing. A display unit 0245 is a liquid crystal display connected to the inspection apparatus 0108, for example. The display unit 0245 accepts a user's inputs to the inspection apparatus 0108 and displays a state of the inspection apparatus 0108. A CPU 0234 performs control and calculation in each unit of the information processing apparatus 0109 via the system bus 0239, and executes programs that are stored in a storage unit 0236 and loaded into a RAM 0235. The RAM 0235 is a kind of typical volatile storage device directly accessible from the CPU 0234, and is used as a work area of the CPU 0234 or other temporary data storage areas. The storage unit 0236 functions as a temporary storage area and a work memory when the information processing apparatus 0109 is in operation. An NW I/F 0237 is connected to the NW I/F 0232 and an NW I/F 0240 via a network. The information processing apparatus 0109 communicates with the inspection apparatus 0108 via the NW I/Fs 0237 and 0232. The information processing apparatus 0109 communicates with the client computer 0110 via the NW I/Fs 0237 and 0240.

A CPU 0243 performs control and calculation in each unit of the client computer 0110 via a system bus 0246, and executes programs that are stored in a storage unit 0244 and loaded into a RAM 0242. The RAM 0242 is a kind of typical volatile storage device directly accessible from the CPU 0243, and is used as a work area of the CPU 0243 or other temporary data storage areas. The storage unit 0244 functions as a temporary storage area and a work memory when the client computer 0110 is in operation.

Figure 3:
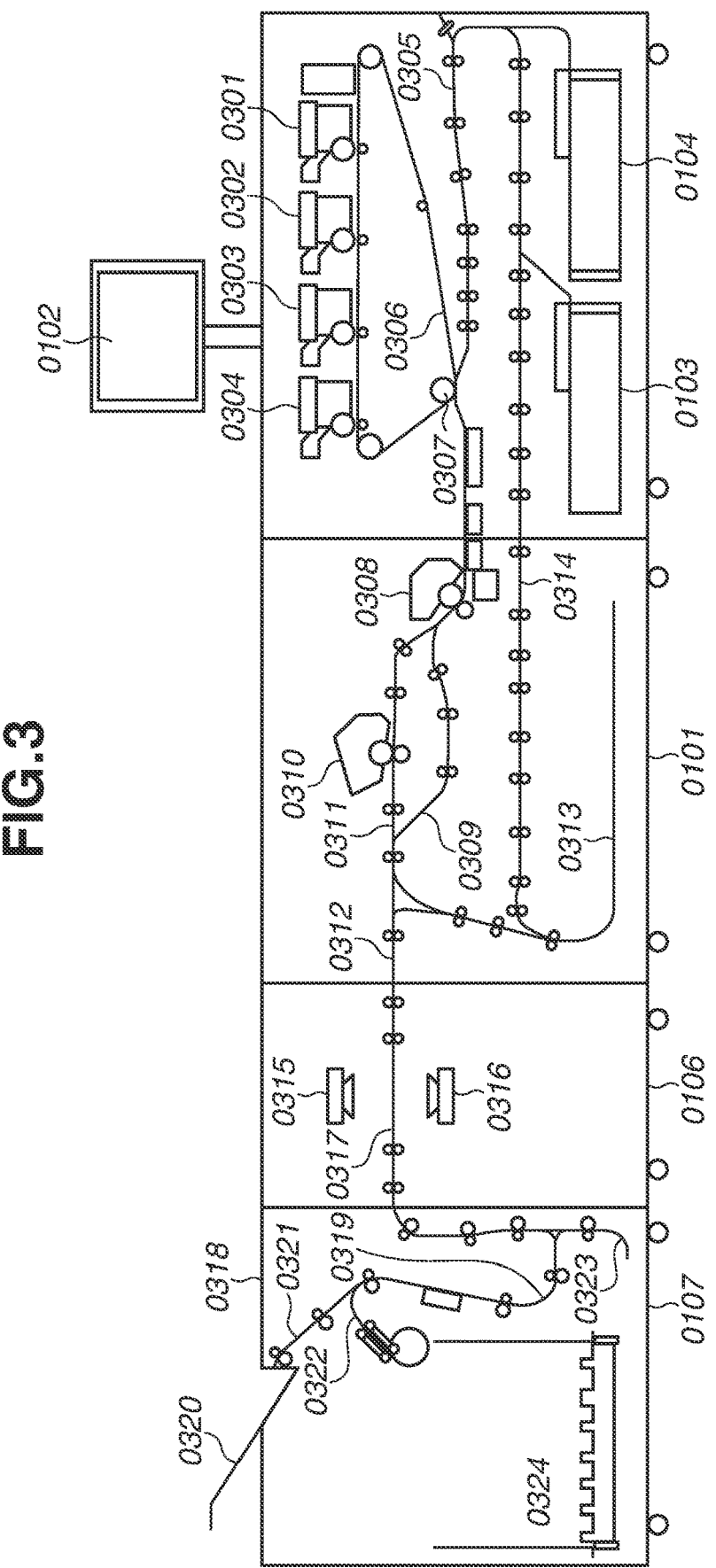
FIG. 3 is a diagram illustrating an internal configuration of the information processing apparatus, an inspection unit, the printing apparatus, and a large capacity stacker.

FIG. 3 is a diagram illustrating an internal configuration of the printing apparatus 0101, the inspection unit 0106, and the large capacity stacker 0107. The printing apparatus 0101 accepts the user's inputs via the UI panel 0102, displays information such as a printing status and a device status, and performs display control. The sheet feed decks 0103 and 0104 can store various types of sheets. Each of the sheet feed decks 0103 and 0104 can separate only the topmost one of the stored sheets and convey the sheet to a sheet conveyance path 0305. Developing stations 0301 to 0304 form toner images using Y, M, C, and K color toners, respectively, to form a color image. The toner images formed by the developing stations 0301 to 0304 are primarily transferred to an intermediate transfer belt 0306. The intermediate transfer belt 0306 rotates clockwise (when viewed from FIG. 3) and transfers the toner images onto the sheet conveyed from the sheet conveyance path 0305 at a secondary transfer position 0307. A fixing unit 0308 includes a pressure roller and a heating roller. Passing the sheet between the rollers melts and presses the toner, whereby the toner images are fixed to the sheet. After exiting the fixing unit 0308, the sheet is conveyed to a sheet conveyance path 0312 via a sheet conveyance path 0309. Depending on the sheet type, additional melting and pressurization may be required for fixing. In such a case, the sheet having passed through the fixing unit 0308 is conveyed to a second fixing unit 0310 via an upper sheet conveyance path. After the application of additional melting and pressurization, the sheet is conveyed to the sheet conveyance path 0312 via a sheet conveyance path 0311. If an image forming mode is a two-sided printing mode, the sheet is conveyed to a sheet reversing path 0313. The sheet is reversed on the sheet reversing path 0313, and then conveyed to a two-sided conveyance path 0314 and subjected to second-side image transfer at the secondary transfer position 0307.

The inspection unit 0106 includes CISs 0315 and 0316 that are opposed to each other. The CIS 0315 reads the front surface of the sheet, and the CIS 0316 reads the back surface of the sheet. The inspection unit 0106 scans the sheet conveyed to a sheet conveyance path 0317 by using the CIS 0315 and/or the CIS 0316 at timing when the sheet reaches a predetermined position. A scanned image generated by scanning the sheet is transmitted to the inspection apparatus 0108 via the inspection apparatus I/F 0215 and the inspection unit I/F 0231. The CPU 0226 determines whether there is a defect in the received image, and notifies the inspection unit 0106 of the determination result via the inspection unit I/F 0231 and the inspection apparatus I/F 0215. The CPU 0216 notifies the large capacity stacker 0107 of the received determination result via the accessory I/Fs 0214 and 0220.

A large number of sheets can be stacked in the large capacity stacker 0107. The large capacity stacker 0107 includes a main tray 0324 as a sheet stacking tray. The sheet having passed through the inspection unit 0106 enters the large capacity stacker 0107 via a sheet conveyance path 0319. The sheet is conveyed from the sheet conveyance path 0319 to the main tray 0324 via a sheet conveyance path 0322, and stacked on the main tray 0324. The large capacity stacker 0107 further includes a top tray 0320 as a discharge tray. The CPU 0221 discharges the sheet to the top tray 0320 if a defect is detected from the sheet by the inspection apparatus 0108. In the case of outputting the sheet to the top tray 0320, the sheet is conveyed from the sheet conveyance path 0319 to the top tray 0320 via a sheet conveyance path 0321. In the case of stacking the sheet on the main tray 0324, a reversing portion 0323 is used to reverse the sheet. In this case, the sheet having entered the large capacity stacker 0107 is once reversed by the reversing portion 0323 and then stacked on the main tray 0324, so that the orientation of the sheet coincides with that of the stacked sheets. In the case of conveying the sheet to the top tray 0320, the sheet is not flipped for stacking but simply discharged without the reversing operation by the reversing portion 0323.

Figure 4:
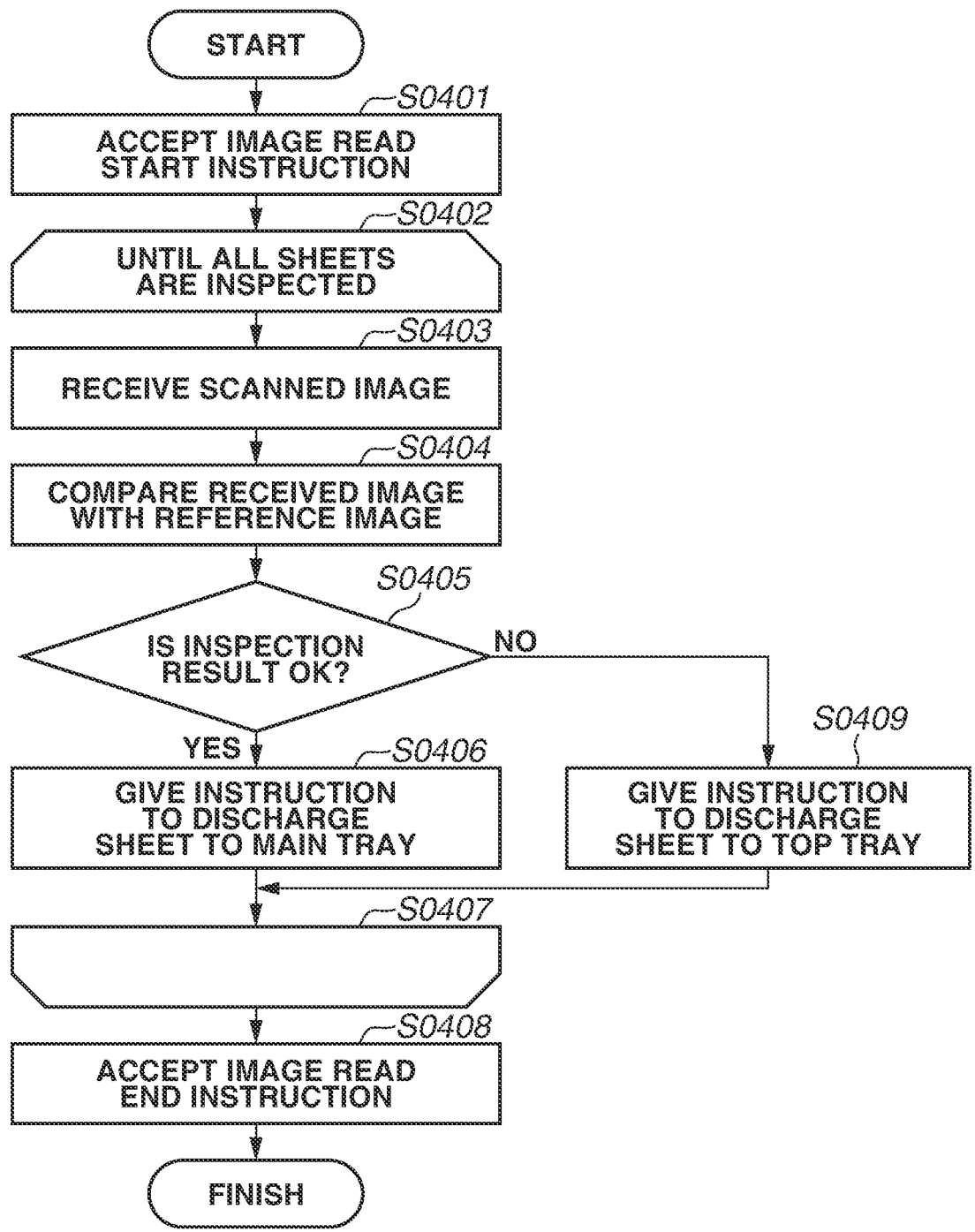
FIG. 4 is a flowchart illustrating a basic operation of the inspection apparatus.

FIG. 4 is an operation flowchart illustrating a basic operation of the inspection apparatus 0108 during inspection.

In step S0401, the CPU 0226 accepts an image read start instruction from the user via the display unit 0245. In step S0402, if there is a sheet to be inspected, the processing proceeds to step S0403.

In step S0403, the inspection unit I/F 0231 receives an image scanned by the CIS 0315 or the CIS 0316 from the inspection apparatus I/F 0215. In step S0404, the CPU 0226 compares the scanned image received in step S0403 with a reference image stored in the RAM 0227. In the case of one-sided inspection, the CPU 0226 performs the comparison processing on the image on one side of the sheet scanned by the CIS 0315 or the CIS 0316. In the case of two-sided inspection, the CPU 0226 performs the comparison processing on each of the images on both sides of the sheet scanned by the CIS 0315 and the CIS 0316. The reference image is generated by scanning sheets, which have been subjected to printing by the printing apparatus 0101, using the CIS 0315 or the CIS 0316, transmitted from the inspection apparatus I/F 0215 to the inspection unit I/F 0231, and then stored in the RAM 0227 before the start of the operation. In the comparison processing, the reference image and the scanned image to be inspected are aligned by using characteristic points thereof as alignment reference points. Next, the four corners of the sheet and the alignment reference points of the scanned image to be inspected are analyzed to detect whether the image is misaligned with respect to the sheet.

Next, the density value of the reference image and the density value of the scanned image to be inspected are compared on a pixel-by-pixel basis. If no defect is detected from the image, the inspection result is acceptable. In the case of two-sided inspection, the inspection result is acceptable if no defect is detected from the images on both sides. If a defect is detected from at least either one of the images on both sides, the inspection result is unacceptable.

In step S0405, if the inspection result is acceptable (YES in step S0405), the processing proceeds to step S0406. In step S0406, the inspection unit I/F 0231 instructs the inspection apparatus I/F 0215 to discharge the sheet to the main tray 0324 of the large capacity stacker 0107, and the processing proceeds to step S0407. Steps S0402 to S0407 are repeated until all sheets are inspected. After all the sheets have been inspected, the processing proceeds to step S0408. In step S0408, the CPU 0226 accepts an image read end instruction from the user via the display unit 0245.

In step S0405, if the inspection result is unacceptable (NO in step S0405), the processing proceeds to step S0409. In step S0409, the inspection unit I/F 0231 instructs the inspection apparatus I/F 0215 to discharge the sheet to the top tray 0320 of the large capacity stacker 0107, and the processing proceeds to step S0407. The subsequent processing can be completed similarly to the foregoing case where the inspection result is acceptable.

The processing described above is just an example. For example, instead of accepting the image read start instruction from the user via the display unit 0245, the image read start instruction may be automatically issued in conjunction with issuance of a print start instruction on the printing apparatus 0101, the information processing apparatus 0109, or the client computer 0110. In addition, instead of accepting the image read end instruction from the user via the display unit 0245, the image read end instruction may be automatically issued in conjunction with completion of printing by the printing apparatus 0101. The instruction mode is not limited in particular.

Figure 5:
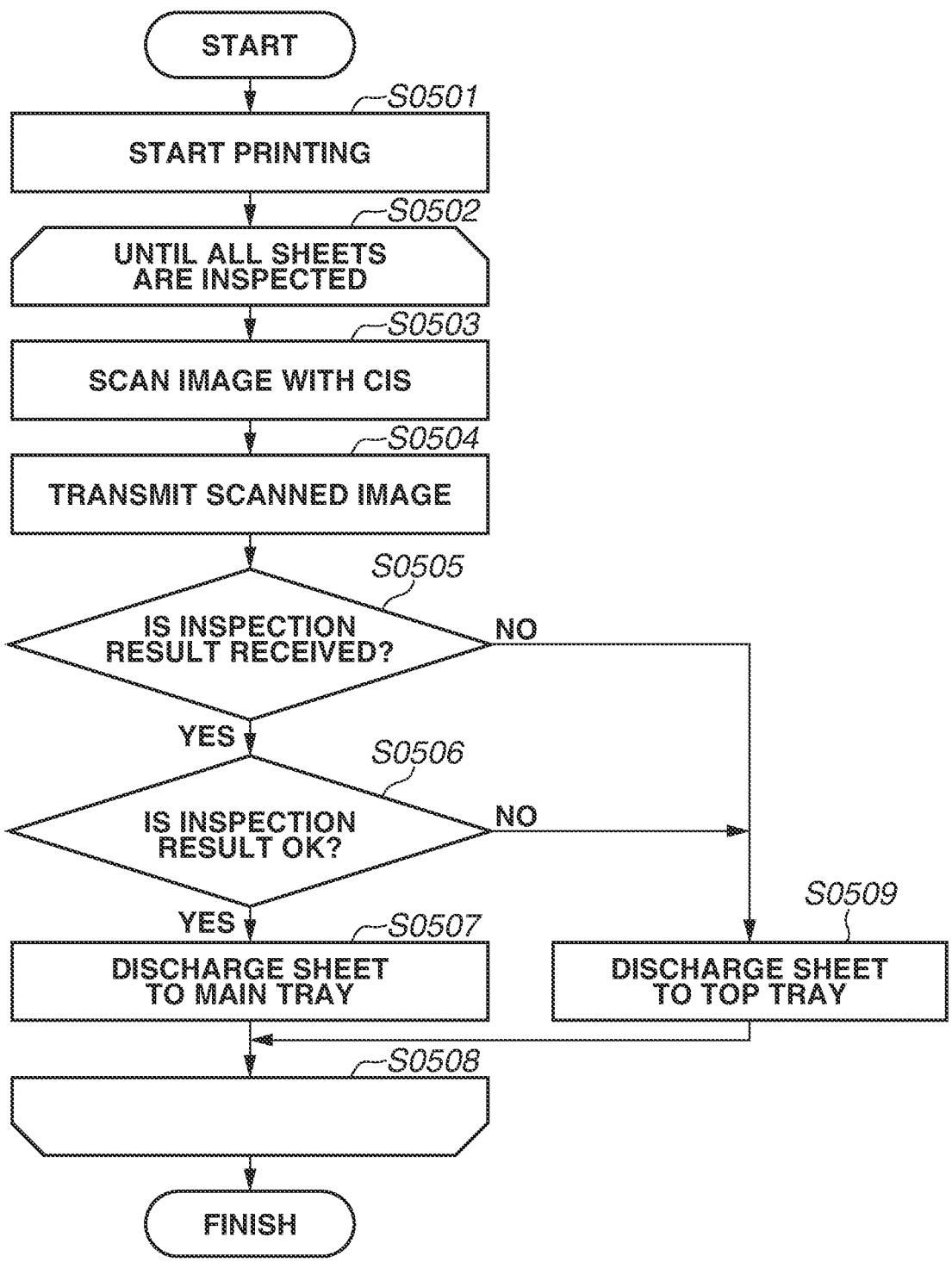
FIG. 5 is a flowchart illustrating a basic operation of the inspection unit during inspection.

FIG. 5 is an operation flowchart illustrating a basic operation of the inspection unit 0106 during inspection.

In step S0501, the CPU 0201 starts printing. Then, the processing proceeds to step S0502. If there is a sheet to be inspected, the processing proceeds to step S0503.

In step S0503, the CIS 0315 or the CIS 0316 scans an image printed on the conveyed sheet. Then, in step S0504, the inspection apparatus I/F 0215 transmits the image scanned in step S0503 to the inspection unit I/F 0231.

In step S0505, if the inspection apparatus I/F 0215 receives an inspection result from the inspection unit I/F 0231 (YES in step S0505), the processing proceeds to step S0506. In step S0506, if the inspection result is acceptable (YES in step S0506), the processing proceeds to step S0507. In step S0507, the accessory I/F 0214 instructs the accessory I/F 0220 to discharge the sheet on which the image scanned in step S0503 is printed, to the main tray 0324 of the large capacity stacker 0107. Then, the processing proceeds to step S0508. Steps S0502 to S0508 are repeated until all the sheets are inspected. After all the sheets have been inspected, i.e., after the printing has been completed, the processing of the flowchart ends.

In step S0506, if the inspection result is unacceptable (NO in step S0506), the processing proceeds to step S0509. In step S0509, the accessory I/F 0214 instructs the accessory I/F 0220 to discharge the sheet on which the image scanned in step S0503 is printed, to the top tray 0320 of the large capacity stacker 0107. Then, the processing proceeds to step S0508. The subsequent processing can be completed similarly to the foregoing case where the inspection result is acceptable.

In step S0505, if no inspection result is received due to a reason such as that the inspection apparatus 0108 is not ready for inspection or that the inspection apparatus 0108 does not finish calculation in time (NO in step S0505), the processing proceeds to step S0509. In step S0509, the CPU 0216 notifies the accessory I/F 0214 that the sheet is to be discharged to the top tray 0320 so that the print product not successfully inspected gets mixed with the print products of which the inspection result is acceptable. The accessory I/F 0214 then instructs the accessory I/F 0220 to discharge the sheet to the top tray 0320. Then, the processing proceeds to step S0508. The subsequent processing can be completed similarly to the foregoing case where an inspection result is received.

In the present exemplary embodiment, the reference image to be used for inspection is generated by using a plurality of scanned images. Each of FIGS. 6A and 6B illustrates a reference image registration screen 0601 for selecting scanned images to generate the reference image. The reference image registration screen 0601 includes an image reading status display section 0602 and an image read instruction button 0603. The display unit 0245 accepts an image read start instruction from the user via the image read instruction button 0603. The character string on the image read instruction button 0603 then changes from "Start reading" to "Stop reading". The character string in the image reading status display section 0602 also changes from "Reading stopped" to "Reading in progress".

In a read image selection section 0604, images scanned by the CIS 0315 or the CIS 0316 and transmitted from the inspection apparatus I/F 0215 to the inspection unit I/F 0231 can be selected and viewed. FIG. 6A illustrates a state where the first image is selected. The selected image (the first image) is displayed in a preview section. An image selection button 0607 (illustrated in FIG. 6B) and an image selection button 0608 can be used to switch the selected image, i.e., the image displayed in the preview section.

Master selection buttons 0605 are radio buttons that can be used to select a master image serving as a reference among a plurality of images to be combined in generating the reference image. FIG. 6A illustrates a state where the first image is selected as the master image.

Each of combination icons 0606 indicates whether the corresponding image is to be used as a combination target image in generating the reference image. FIG. 6A illustrates a state where all the images except the third one are to be used.

The reference image registration screen 0601 further includes a reference image generation button 0610 and a cancel button 0609. If the cancel button 0609 is pressed, the generation of the reference image is cancelled, and all the images transmitted from the inspection apparatus I/F 0215 to the inspection unit I/F 0231 are discarded. If the reference image generation button 0610 is pressed, all the images selected for use by the combination icons 0606 are combined to generate the reference image.

FIG. 6B illustrates the reference image registration screen 0601 where the third image determined not to be used in generating the reference image is displayed. With the first image set as the master image, the third image is determined not to be used because a stain 0611 is observed thereon.

Next, characteristic processing according to the present exemplary embodiment will be described with reference to the flowchart of FIG. 7.

A program of the printing apparatus 0101 related to the flowchart is stored in the storage unit 0205 of the printing apparatus 0101, read into the RAM 0202, and executed by the CPU 0201. A program of the inspection apparatus 0108 related to the flowchart is stored in the storage unit 0228 of the inspection apparatus 0108, read into the RAM 0227, and executed by the CPU 0226. A program of the information processing apparatus 0109 related to the flowchart is stored in the storage unit 0236 of the information processing apparatus 0109, read into the RAM 0235, and executed by the CPU 0234. A program of the client computer 0110 related to the flowchart is stored in the storage unit 0244 of the client computer 0110, read into the RAM 0242, and executed by the CPU 0243.

In step S0701, the CPU 0226 creates an inspection job. The inspection job is the unit of a record that holds inspection-related information such as the reference image, the number of sheets to be inspected, and inspection settings. In step S0702, the display unit 0245 accepts an image read start instruction from the user via the image read instruction button 0603. The inspection unit I/F 0231 sequentially receives a plurality of images that are printed by the printing apparatus 0101 and scanned by the CIS 0315 or the CIS 0316 from the inspection apparatus I/F 0215. If all the scanned images are received, the display unit 0245 accepts an image read end instruction from the user via the image read instruction button 0603.

In step S0703, the CPU 0226 displays the reference image registration screen 0601 on the display unit 0245 with the first image set (specified) as the master image. Accordingly, in step S0704, the first image is displayed in the preview section. Then, the processing proceeds to step S0705 to inspect the images other than the master image. In step S0706, the CPU 0226 compares each image other than the master image with the master image, and determines whether the image is suitable for use as a combination target image in generating the reference image. Here, the master image and the image are first aligned by using characteristic points thereof as alignment reference points. Next, the image is inspected for significant misalignment with reference to the sheet by using the four corners of the sheet and the characteristic points of the image. Finally, the density value of the master image and the density value of the image are compared on a pixel-by-pixel basis. If no defect is found in any of the foregoing inspections, the CPU 0226 determines that the image is suitable for use as the combination target image (YES in step S0706) and the processing proceeds to step S0709. In step S0709, the CPU 0226 determines to use the image as the combination target image. In step S0706, if the image is determined not to be suitable for use as the combination target image (NO in step S0706), the processing proceeds to step S0707. In step S0707, the CPU 0226 determines not to use the image as the combination target image.

The processing of the foregoing steps S0705 to S0709 is repeated until all the images other than the master image are inspected. After all the images other than the master image have been inspected, the processing proceeds to step S0710. In step S0710, the display unit 0245 displays the reference image registration screen 0601 which indicates whether the respective images are to be used as the combination target images in generating the reference image, by using the combination icons 0606.

In step S0711, if another image is to be displayed on the reference image registration screen 0601 where the first image is currently displayed (YES in step S0711), the processing proceeds to step S0712. In step S0712, the display unit 0245 displays, on the reference image registration screen 0601, another image selected by a press of the image selection button 0607 or 0608. Then, the processing proceeds to step S0713. In step S0711, if no other image is to be displayed (NO in step S0711), the processing also proceeds to step S0713.

In step S0713, the display unit 0245 accepts, via any of the combination icons 0606, a change made by the user to whether to use the image as the combination target image in generating the reference image. If the display unit 0245 accepts an instruction from the user to switch between use and non-use of the image (YES in step S0713), the processing proceeds to step S0715. In step S0715, the display unit 0245 displays a result of switching between use and non-use of the image. For example, if the user gives an instruction not to use the image that has been selected for use, the display unit 0245 changes an indication of use 0613 illustrated in FIG. 6A to an indication of non-use 0612 illustrated in FIG. 6A. Then, the processing proceeds to step S0714.

In step S0713, if the display unit 0245 does not detect, via any of the combination icons 0606, a change made by the user to whether to use the image as the combination target image in generating the reference image (NO in step S0713), the processing also proceeds to step S0714.

In step S0714, if the display unit 0245 accepts an instruction from the user to change the master image via any of the master selection buttons 0605 (YES in step S0714), the processing proceeds to step S0704. The processing for inspecting the images other than the master image is repeated again with the changed master image. In step S0714, if the master image is not changed (NO in step S0714), the processing proceeds to step S0716. In step S0716, if the number of images to be used as the combination target images is greater than or equal to a predetermined number (YES in step S0716), the processing proceeds to step S0718. In step S0718, the display unit 0245 accepts a reference image generation instruction from the user via the reference image generation button 0610. Then, in step S0719, the CPU 0226 generates the reference image by combining all the images that are determined to be used as the combination target images, and then the processing ends.

The reason for setting the predetermined number of images is to improve the inspection accuracy. More specifically, generating a reference image by combining a plurality of images can minimize the effect of small image defects or misalignment and achieve a smooth high-quality reference image. Use of the high-quality reference image can achieve the execution of more accurate inspection.

In step S0716, if the number of images to be used as the combination target images does not reach the predetermined number (NO in step S0716), the processing proceeds to step S0717. In step S0717, additional images are obtained. More specifically, the inspection unit I/F 0231 sequentially receives (obtains) images that are printed by the printing apparatus 0101 and scanned by the CIS 0315 or the CIS 0316 from the inspection apparatus I/F 0215. Then, the processing proceeds to step S0704. In step S0704, the images other than the master image are inspected by using the master image. The inspection is performed on the scanned image generated by scanning the surface to be inspected of the print product. The subsequent processing of the flowchart can be completed in a similar manner to the foregoing case.

In the present exemplary embodiment, the example has been described in which the alignment inspection is performed first and then the density inspection is performed. However, it is not limited thereto. The inspections may be performed in parallel, or the density inspection may be performed first. Moreover, in the present exemplary embodiment, the example has been described in which the reference image generation instruction is accepted from the user after whether the number of images to be used as the combination target images in generating the reference image reaches the predetermined number. Alternatively, the acceptance of the instruction from the user may be omitted, and all the processing may be automatically completed.

In the present exemplary embodiment, an image determined not to be suitable for use as the combination target image in step S0706 is controlled not to be changed from non-use to use in step S0713. However, if the user checks on the screen an image determined not to be suitable for use as the combination target image, and permits the use of the image, the image may be changed from non-use to use.

In the present exemplary embodiment, the printing apparatus 0101 and the inspection apparatus 0108 have been described as separate apparatuses. Alternatively, the printing apparatus 0101 may include a unit equivalent to the inspection apparatus 0108.

In the foregoing exemplary embodiment, generating the reference image by using a plurality of scanned images can achieve accurate inspection. In addition, using only scanned images determined to be suitable for use in generating the reference image can achieve even more accurate inspection. Furthermore, determining whether scanned images are suitable for use in generating the reference image and excluding unsuitable ones automatically can reduce the user's burden of operation.

By using the foregoing procedure according to the present exemplary embodiment, when the inspection apparatus 0108 generates a reference image, whether images are suitable for use in generating the reference image is determined, and an image determined not to be suitable for use in generating the reference image is excluded automatically. Thus, when a reference image for evaluating the quality of a print product is generated by combining a plurality of images, a high-quality reference image can be generated, and as a result, high inspection accuracy can be maintained.

In the exemplary embodiment described above, when a reference image for evaluating the quality of a print product is generated by combining a plurality of images, a high-quality reference image can be generated, and as a result, high inspection accuracy can be maintained.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-205588, filed Nov. 13, 2019, which is hereby incorporated by reference herein in its entirety.

What is claimed is:

1. An information processing apparatus comprising:
at least one processor; and
at least one memory coupled to the at least one processor and having instructions stored thereon, wherein the instructions, when executed by the at least one processor, cause the information processing apparatus to act as:
a first obtaining unit configured to obtain a plurality of scanned images by scanning a plurality of print products printed by a printing apparatus;
a determination unit configured to determine whether each of the plurality of scanned images is suitable for use in generating a reference image, by using a master image for generating the reference image, wherein the reference image is used for evaluating a quality of a surface to be inspected of a print product printed by the printing apparatus; and
a generation unit configured to generate the reference image by combining a plurality of scanned images determined to be suitable for use in generating the reference image among the plurality of scanned images.

2. The information processing apparatus according to claim 1, wherein the instructions, when executed by the at least one processor, further cause the information processing apparatus to act as:
a second obtaining unit configured to obtain a first scanned image different from the plurality of scanned images by scanning the surface to be inspected of the print product printed by the printing apparatus; and
an evaluation unit configured to evaluate the quality of the surface to be inspected of the print product printed by the printing apparatus, based on the first scanned image and the reference image.

3. The information processing apparatus according to claim 1, wherein the determination unit is configured to determine whether each of the plurality of scanned images is non-defective by using the master image for generating the reference image, and determine that a plurality of scanned images determined to be non-defective is suitable for use in generating the reference image among the plurality of scanned images.

4. The information processing apparatus according to claim 1, wherein the instructions, when executed by the at least one processor, further cause the information processing apparatus to act as a specification unit configured to specify the master image among the plurality of scanned images.

5. The information processing apparatus according to claim 1, wherein the instructions, when executed by the at least one processor, further cause the information processing apparatus to act as a display control unit configured to display a scanned image determined not to be suitable for use in generating the reference image by the determination unit, along with information indicating that the scanned image is excluded from the plurality of scanned images.

6. A method comprising:
   obtaining a plurality of scanned images by scanning a plurality of print products printed by a printing apparatus;
   determining whether each of the plurality of scanned images is suitable for use in generating a reference image, by using a master image for generating the reference image, wherein the reference image is used for evaluating a quality of a surface to be inspected of a print product printed by the printing apparatus; and
   generating the reference image by combining a plurality of scanned images determined to be suitable for use in generating the reference image among the plurality of scanned images.

7. The method according to claim 6, further comprising:
   obtaining a first scanned image different from the plurality of scanned images by scanning the surface to be inspected of the print product printed by the printing apparatus; and
   evaluating the quality of the surface to be inspected of the print product printed by the printing apparatus, based on the first scanned image and the reference image.

8. The method according to claim 6, wherein, in the determining, whether each of the plurality of scanned images is non-defective is determined by using the master image for generating the reference image, and a plurality of scanned images determined to be non-defective is determined to be suitable for use in generating the reference image among the plurality of scanned images.

9. The method according to claim 6, further comprising specifying the master image among the plurality of scanned images.

10. The method according to claim 6, further comprising displaying a scanned image determined not to be suitable for use in generating the reference image in the determining, along with information indicating that the scanned image is excluded from the plurality of scanned images.

* * * * *